(No Model.)
L. R. LEWIS.
MILK COOLER.
No. 587,369.      Patented Aug. 3, 1897.
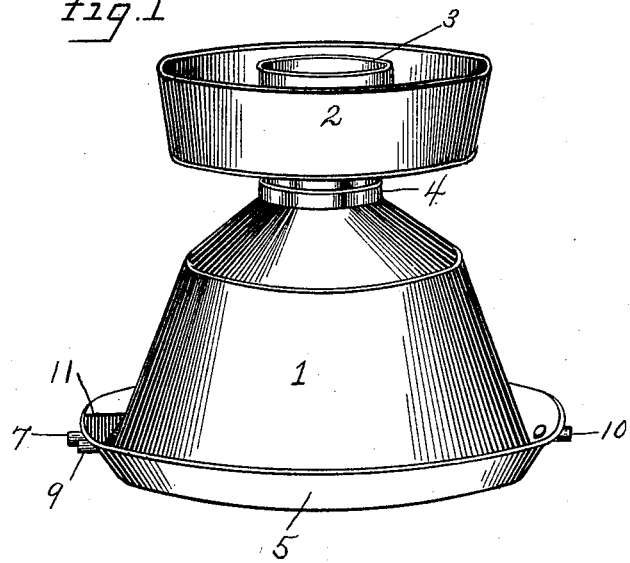
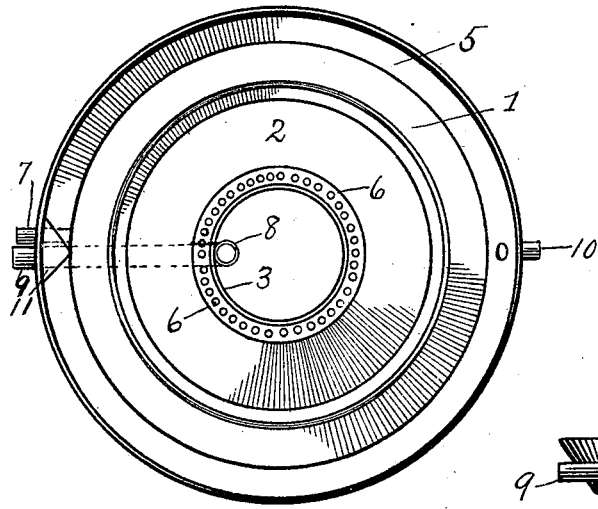
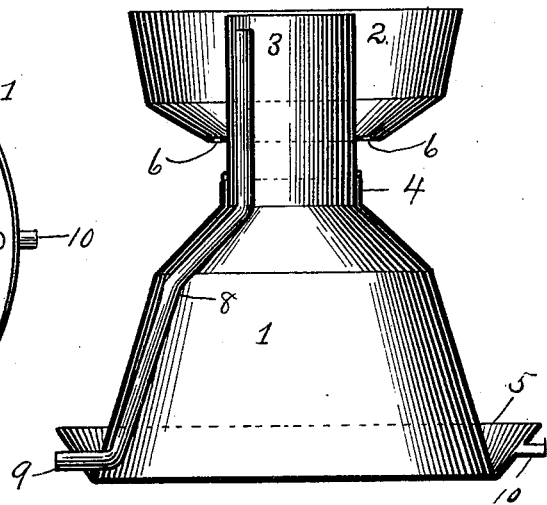
WITNESSES
E. T. Ryan
J. W. Johnson
INVENTOR
Lynn R. Lewis
BY J. W. Suggett and
J. R. Nottingham
ATTORNEYS.

UNITED STATES PATENT OFFICE.

LYNN R. LEWIS, OF CORTLAND, NEW YORK.

MILK-COOLER.

SPECIFICATION forming part of Letters Patent No. 587,369, dated August 3, 1897.

Application filed April 9, 1897. Serial No. 631,430. (No model.)

*To all whom it may concern:*

Be it known that I, LYNN R. LEWIS, a citizen of the United States, residing at Cortland, in the county of Cortland and State of New York, have invented certain new and useful Improvements in Milk Coolers and Aerators; and I do hereby declare the following to be a full, clear, and exact description of the invention, such as will enable others skilled in the art to which it appertains to make and use the same.

My invention relates to milk coolers and aerators; and it consists of certain novel and useful improvements in construction, as will be hereinafter fully described, and particularly set forth in the claims.

The particular object of the invention is to produce a device for cooling, aerating, and deodorizing milk to relieve it of animal heat and which shall be simple in construction and effective in operation. This object is attained by means of the mechanism illustrated in the accompanying drawings, in which—

Figure 1 is a perspective view of my improved cooler; Fig. 2, a top plan view, and Fig. 3 a vertical central sectional view.

Referring to the several views, the numeral 1 indicates the main cooling-chamber, 2 the milk-reservoir, and 3 an extension of the cooling-chamber. The main cooling-chamber is in the form of a truncated cone with an inclined top having a vertical collar 4, and is provided with a bottom which extends beyond the wall of the chamber and is turned upwardly to form with the wall of said chamber a V-shaped trough 5, the purpose of which will be hereinafter explained.

The extension of the cooling-chamber is cylindrical in form and extends up through and forms a part of the milk-reservoir, thus creating a primary cooling-surface for the milk when it is first poured into the reservoir. The latter is held in position above the cooling-chamber by means of the lower portion of the extension fitting into the collar 4. The bottom of the milk-reservoir is inclined reversely to the inclined top of the cooling-chamber and is provided with perforations 6 immediately surrounding the extension of said chamber. The cooling-chamber is provided with an inlet-tube 7, through which water is admitted to said chamber, and an overflow-pipe 8 extends from the bottom of said chamber up into the extension, said pipe conforming to the walls of the chamber and extension. The overflow-pipe is provided with an outlet-tube 9, which extends through the V-shaped trough 5. The V-shaped trough is provided with an outlet-tube 10, through which the milk is discharged into any proper vessel that may be provided.

In using my improved cooler and aerator cold water is supplied, preferably under pressure, to the main cooling-chamber through inlet-tube 7. Filling said chamber it rises in the extension to the overflow-pipe, through which it is discharged, thus maintaining a constant circulation of the cold water. Milk being poured into the reservoir it passes through the perforations in the bottom of said reservoir and falling in fine streams upon the inclined top of the main cooling-chamber is spread out in a thin sheet over and down the outer surface of said chamber into the V-shaped trough. This trough is provided with an angular partition 11, which serves to cause the falling milk to divide and run around the wall of the cooling-chamber in opposite directions, meeting at the outlet-tube 10, through which it is discharged.

It will be observed that in my improved cooler and aerator the milk comes into contact with the cold surface of the extension at the instant it is being poured into the reservoir, thereby cooling it to some extent before it passes through the perforated bottom of the reservoir and falls upon the cold inclined spreader-surface of the main cooling-chamber.

By placing the milk-reservoir a suitable distance above the inclined top of the cooling-chamber the milk is caused to pass through the open air before it strikes said top and is therefore partially relieved of some of its odor, and by the time it reaches the V-shaped trough it is thoroughly aerated and deodorized as well as cooled.

Having thus fully described my invention, what I claim as new, and desire to secure by Letters Patent, is—

1. In a milk-cooler, the combination of the main cooling-chamber having an inclined top provided with a central opening surrounded by a collar, a detachable milk-reservoir, seated on the collar, having a central opening surrounded by a number of perforations so arranged that the discharge of milk will pass through the open air before falling upon the top of said chamber; a primary cooling-chamber extending up through said opening into the milk-reservoir, and an overflow-pipe having its inlet within the primary cooling-chamber and its outlet on the outside of the main cooling-chamber near the bottom thereof.

2. In a milk-cooler, the combination of the main cooling-chamber having an inclined top provided with a central opening surrounded by a collar, a detachable milk-reservoir, seated on the collar, having a central opening surrounded by a number of perforations for the discharge of the milk, a primary cooling-chamber extending up through said opening into the milk-reservoir, an overflow-pipe having its inlet within the primary cooling-chamber and its outlet on the outside of the main cooling-chamber near the bottom thereof, and a milk-receiving trough at the bottom of said cooling-chamber divided by a partition, whereby the milk is directed upon each side of said chamber toward the outlet-pipe in a slightly-accelerated flow.

In testimony whereof I affix my signature in the presence of two witnesses.

LYNN R. LEWIS.

Witnesses:
JOHN W. SUGGETT,
S. S. KNOX.